Figure 1:
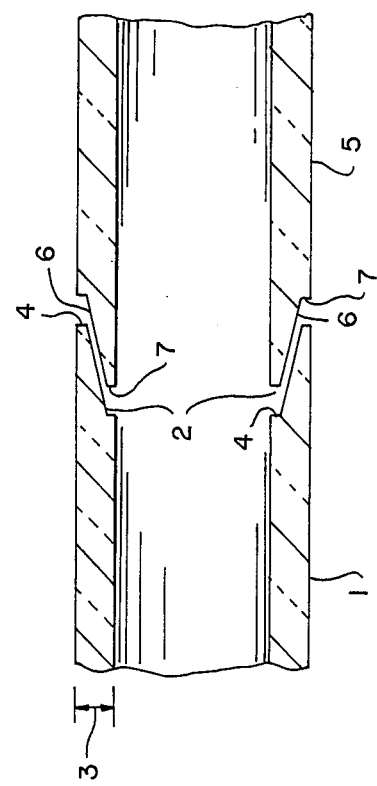

United States Patent [19]

Mizuhara

[11] Patent Number: 4,780,161
[45] Date of Patent: Oct. 25, 1988

[54] CERAMIC TUBE

[75] Inventor: Howard Mizuhara, Hillsborough, Calif.

[73] Assignee: GTE Products Corporation, Stamford, Conn.

[21] Appl. No.: 125,846

[22] Filed: Nov. 27, 1987

Related U.S. Application Data

[63] Continuation-in-part of Ser. No. 034,504, Apr. 6, 1987.

[51] Int. Cl.4 .............................................. B32B 31/04
[52] U.S. Cl. ...................................... 156/89; 156/153; 156/258; 156/293; 156/304.2; 156/304.5
[58] Field of Search ............... 156/89, 258, 304.2, 156/304.5, 308.2, 153, 293; 264/56, 57, 58, 67; 228/120, 193, 195, 196, 199, 203, 154; 65/36, 42, 43

[56] References Cited

U.S. PATENT DOCUMENTS

| 1,954,610 | 4/1934 | Bebie | 156/258 |
| 2,174,218 | 9/1939 | Greeve | 228/154 |
| 2,623,571 | 12/1952 | Webber | 156/304.2 |
| 2,795,440 | 6/1957 | Holycross et al. | 156/258 |
| 2,998,646 | 9/1961 | Hitz | 228/193 |
| 3,239,323 | 3/1966 | Folweiler | 156/89 |
| 4,487,644 | 12/1984 | Gupta et al. | 156/89 |

FOREIGN PATENT DOCUMENTS

| 1159628 | 12/1963 | Fed. Rep. of Germany | 156/304.5 |
| 567973 | 3/1945 | United Kingdom | 156/304.5 |

Primary Examiner—Caleb Weston
Attorney, Agent, or Firm—James Theodosopoulos

[57] ABSTRACT

A long alumina ceramic tube having good linearity is made by longitudinally joining shorter alumina tubes at the ends thereof. The ends have tapered surfaces thereat to increase the contact surface of the joint. The contact surface has a thin coating of a alumina containing composition thereon which is fired at a high temperature to provide a secure joint between the shorter alumina tubes.

1 Claim, 2 Drawing Sheets

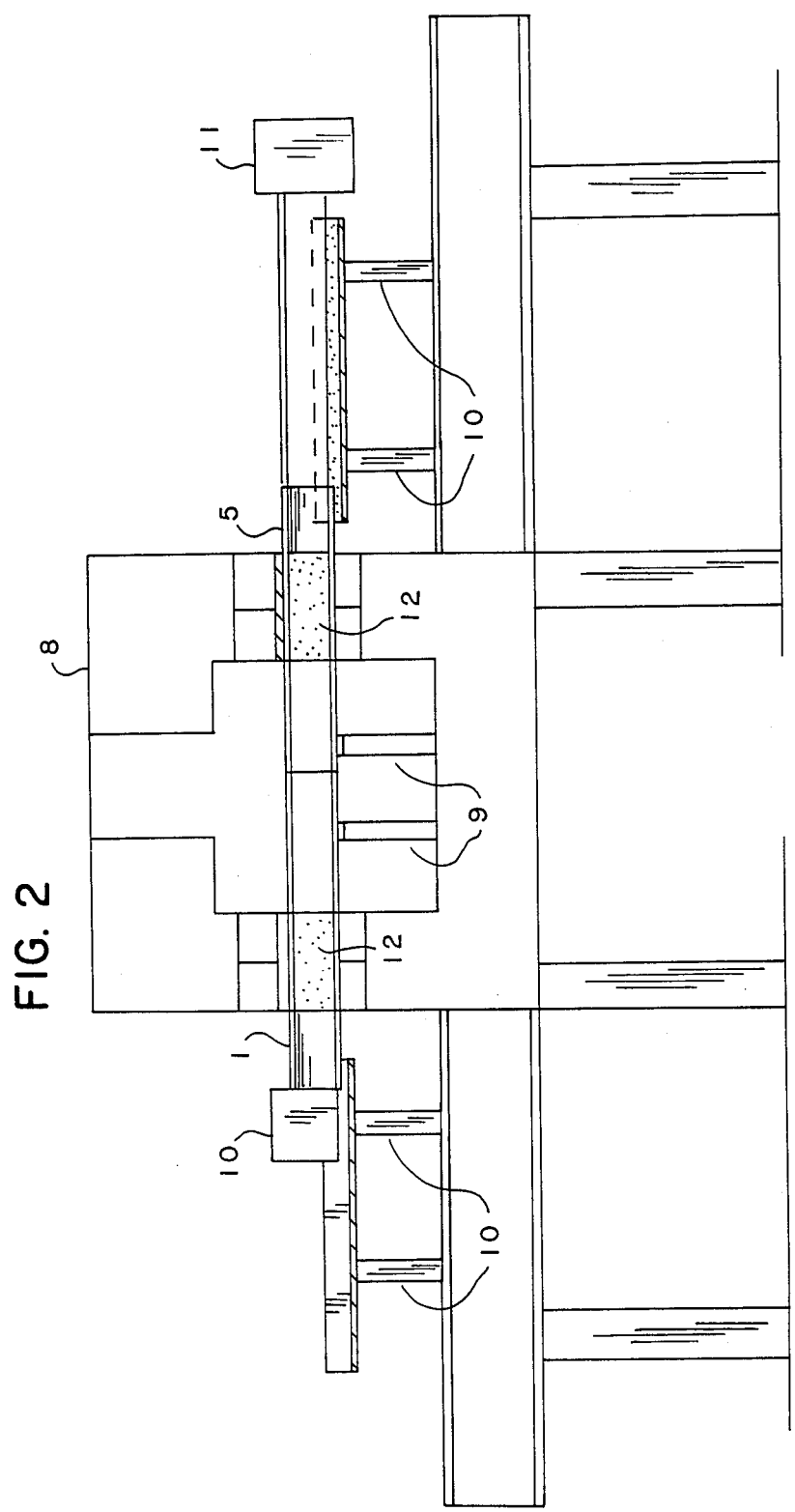

CERAMIC TUBE

This application is a continuation-in-part of U.S. Ser. No. 034,504 filed Apr. 6, 1987. This invention concerns the manufacture of a ceramic tube for high temperature use. In some applications, it is required that the tube be quite lengthy and quite true in linearity. In one such application, where a copper vapor atmosphere is maintained within the tube at 1500° C., a particular tube is 9' long by 3" inside diameter. In the past, the tube was made by slip casting in one piece. Because of the 9' length, it was difficult to maintain the desired degree of linearity, especially where the slip cast ceramic composition had to be sintered at a high temperature. This invention discloses a method of making such a tube having improved linearity.

In this invention, the desired tube is made by first making shorter tubes having predetermined dimensions and then joining the ends of the shorter tubes under conditions that will provide the improved linearity. The reason for the use of the shorter tubes is that it is easier to maintain linearity in a shorter tube than it is in a longer tube. The ends of the tubes are ground to a taper that mates with each other. The tapered ends of the tubes are then fitted together, with a thin layer of a ceramic composition therebetween, and then sintered at a high temperature to obtain a strong joint. Ideally, the ceramic composition includes the ceramic material of the tubes, for example, alumina, and the sintering temperature is sufficiently high to obtain diffusion at the joint and to approach obtaining a monolithic structure at the joint.

In one example, alumina tubes, about three feet long, were made by isostatic pressing A1998C (99.8% Al₂O₃) alumina powder on a mandrel, removing the pressed tube, and then fully sintering at 1700° C. The diameter of the mandrel was carefully selected so that after sintering, which resulted in about 20% shrinkage, the sintered tube had the desired inside diameter of 3" and had, after outside machining, a wall thickness of ¼". The tube was then cut to a length of 37.4".

A taper was then ground into the end of the tube as shown in FIG. 1. On tube 1, shown on the left side of FIG. 1, an inside taper 2 was ground on the right end of tube 1. In one example, taper 2 was 10°, and wall thickness 3 was ¼". The 10° taper increased the length of the contact surface area at tube ends from ¼" to about 1.4", thereby considerably strengthening the joint. A flat surface 4, about 10 mils long, was ground at each end of the taper to serve as a stop when tubes 1 and 5 are butted for joining. Tube 5 is shown on the right side of FIG. 1. an outside 10° taper 6 was ground on the left end of tube. 5. There were also similar 10 mil long flat surfaces 7 ground at each end of taper 6.

The tapered surfaces of tubes 1 and 2 were coated with a joining compound consisting of finely ground calcium aluminate, alumina, an organic vehicle and organic dye, and the coated ends were butted together. Since the joining compound is only thinly applied, the dye provided color to aid in applying uniform coating. The excess coating was wiped off the inner and outer seams. The joint is then fired at a high temperature to bond the tubes together, as shown in FIG. 2.

Tubes 1 and 5, butted together, are placed inside clamshell furnace 8, the butted ends being about at the center of furnace 8 and the other ends of each tube protruding outside furnace 8. There are adjustable alumina supports 9 inside furnace 8 and adjustable supports 10 outside the furnace to support the entire lengths of tubes 1 and 5. Prior to firing the furnace, supports 9 and 10 are adjusted to align tubes 1 and 5 for accurate linearity. There is a stop 10 at the left end of tube 1 and a spring loaded or hydraulic force 11 at the right end of tube 5 in order to place the tubes in longitudinal compression during firing. This also aids in keeping the thickness of the joint between the tapered ends quite thin. Ideally, the thickness of the joint after sintering should be in the order of 1 or 2 mils. Alumina plugs 12, slightly smaller than the I.D. of the tubes, are inserted inside tubes 1 and 5 to about 12" from the joint. Their purpose is to reduce radiation heat loss. The furnace, burning natural gas and air, is then ignited and the joint is fired at about 1700° C. for about three hours under a longitudinal force of about 150 to 300 grams per square inch. The calcium aluminate has a liquid phase at about 1500° C., and the liquid phase reacts with the alumina of the alumina tube to form a higher alumina composition, which is non-liquid and more refractory than the starting calcium aluminate.

A third three foot long tube can be joined to the right end of tube 5 in a similar manner to provide the desired 9' tube having improved linearity.

In a second example, a 5° taper was used, instead of 10°. This increased the length of the contact surface area at the tube ends from 1.4" to 2.8", thereby decreasing the load per unit contact area at the joint.

Tubes made of AL-995 alumina (99.5% alumina content) were evaluated with two different coating pastes, one made of 99.5% finely ground alumina and the other made with the following mix.

Alumina, less than 1 um: 98.00 gm
Bentonite: 1.00
MgCO₃: 1.00
Water (dry weight): 24.0
Ammonium Citrate (dry weight): 0.1
Few drops of red dye The pastes were wet milled using 99.8% alumina media in 99.8 alumina mill for 24 hours. The pastes were then applied on the tapered sections and the tubes were assembled while wet. Using the equipment described in FIG. 2, the assembled tubes were fired at 1700° C. for 2 hours under constant end loading, then slowly cooled. Both coating pastes gave satisfactory results.

Six different pastes were evaluated for use with Al-995 tubes by applying the pastes between AL-995 plates, firing at 1600° C. and then dye checking the joints between the plates for seam porosity. Best results were obtained with the 99.5% alumina paste and the 98% alumina, 1% bentonite, 1% Mg CO₃ paste. The other four pastes, namely, AL-300 (97.6% alumina), AL-600 (96% alumina), AL-500 (94% alumina) and calcium aluminate containing up to 30% of A-14 alumina (99.6% alumina content) also gave satisfactory results, but not as good.

I claim:

1. The method of making an elongated alumina tube having a predetermined length comprising the steps of preparing two sintered alumina tubes each having a length shorter than said predetermined length, grinding an outside tapered surface on one end of one of said two sintered alumina tubes, grinding a mating inside tapered surface on one end of the other of said two sintered alumina tubes, thinly coating said tapered surfaces with a coating paste made of at least 94% finely powdered alumina, butting the ends of the two sintered alumina tubes together so that the tapered surfaces mate, firing said mated ends under a compressive longitudinal force at a high temperature to promote a liquid phase and diffusion bonding between the tapered surfaces and to form a secure joint therebetween.

* * * * *